US009298467B2

(12) United States Patent
Jackson

(10) Patent No.: US 9,298,467 B2
(45) Date of Patent: Mar. 29, 2016

(54) SWITCH STATEMENT PREDICTION

(71) Applicant: IMAGINATION TECHNOLOGIES, LTD., Kings Langley (GB)

(72) Inventor: Hugh Jackson, St. Albans (GB)

(73) Assignee: Imagination Technologies Limited, Kings Langley (GB)

( * ) Notice: Subject to any disclaimer, the term of this patent is extended or adjusted under 35 U.S.C. 154(b) by 160 days.

(21) Appl. No.: 14/153,188

(22) Filed: Jan. 13, 2014

(65) Prior Publication Data

US 2014/0201509 A1 Jul. 17, 2014

(30) Foreign Application Priority Data

Jan. 14, 2013 (GB) .................................. 1300608.5
Dec. 18, 2013 (GB) .................................. 1322389.6

(51) Int. Cl.
*G06F 9/38* (2006.01)
(52) U.S. Cl.
CPC .................................... *G06F 9/3844* (2013.01)
(58) Field of Classification Search
CPC combination set(s) only.
See application file for complete search history.

(56) References Cited

U.S. PATENT DOCUMENTS

| 5,608,886 A | 3/1997 | Blomgren et al. |
| 2004/0172524 A1* | 9/2004 | Hoogerbrugge .............. 712/239 |
| 2004/0225838 A1* | 11/2004 | Biles ............................. 711/118 |
| 2011/0078425 A1* | 3/2011 | Shah et al. .................... 712/239 |
| 2011/0289300 A1 | 11/2011 | Beaumont-Smith et al. |
| 2011/0320787 A1 | 12/2011 | Dieffenderfer et al. |

OTHER PUBLICATIONS

Chang, Po-Yung etal., Target Prediction for Indirect Jumps, 1997, ACM, pp. 274-283.*
Kalamatianos, J., etal., Predicting Indirect Branches via Data Compression, 1998,IEEE, pp. 272-281.*
Farooq et al., Value Based BTB Indexing for Indirect Jump Prediction, 2009, IEEE, 11 pages.*
Combined Search and Examination Report under Sections 17 and 18(3), dated Jul. 22, 2013, as cited in GB Application 1300608.5.
Farooq et al., Compiler Suport for Value-Based Indirect Branch Prediction, 21st International Confeence on Compiler Construction, Mar. 24-Apr. 1, 2012, pp. 185-199.
Farooq et al, Compiler Support for Value-Based Indirect Branch Prediction DOI: 10.1007/978-3-642-28652-0, Proceedings on 21st International Conference on Compiler Construction, Mar. 24-Apr. 1, 2012, pp. 185-199.

* cited by examiner

*Primary Examiner* — Eric Coleman
(74) *Attorney, Agent, or Firm* — Vorys, Sater, Seymour and Pease LLP; Vincent M DeLuca

(57) ABSTRACT

Methods and branch predictors for predicting a target location of a jump table switch statement in a program. The method includes continuously monitoring instructions at the branch predictor to determine if they write to registers used to store an input variable to a jump table switch statement. Any update to a monitored register is stored in a register table maintained by the branch predictor. Then when it comes time to make a prediction for a jump table switch statement instruction the branch predictor uses the register value stored in the table is used to predict where the jump table switch statement will branch to.

20 Claims, 5 Drawing Sheets

| Instruction Identification Tag | Argument Register ID | Argument Register Value | Arg. Valid |
|---|---|---|---|
| 0x80881234 | R8 | NA | False |
| 0x80881038 | R3 | 0x5 | True |
| 0x8088108C | R9 | 0x28 | True |
| 0x80881140 | R7 | NA | False |

SWITCH STATEMENT PREDICTION

BACKGROUND

Out of-order processors typically comprise a branch predictor which predicts which direction the program flow will take in the case of instructions known to cause possible flow changes, such as a branch instructions. Branch prediction is useful as it enables instructions to be speculatively executed by the processor before the outcome of the branch instruction is known.

However, indirect branches (e.g. branches based on a variable rather than a constant value) are difficult to predict as the branch predictor must predict both whether the branch is taken and where the target will be. Accordingly, many branch predictors are unable to accurately predict indirect branches.

One solution to this has been to improve the prediction algorithm used by the branch predictor. However, this is often quite difficult and time intensive.

Another solution has been to implement a compiler that is configured to remove code related to any switch-like structure thus removing the need for an indirect branch. However, it is difficult to recognize situations in which the code can be removed.

The embodiments described below are not limited to implementations which solve any or all of the disadvantages of known out-of-order processors.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Described herein are methods and branch predictors for predicting a target location of a jump table switch statement in a program. The method includes continuously monitoring instructions at the branch predictor to determine if they write to registers used to store an input variable to a jump table switch statement. Any update to a monitored register is stored in a register table maintained by the branch predictor. Then when it comes time to make a prediction for a jump table switch statement instruction the branch predictor uses the register value stored in the table is used to predict where the jump table switch statement will branch to.

A first aspect provides a method to predict a target location of a switch statement in a program executed by a processor, the method comprising: storing, in a register table maintained by a branch predictor, a current value for at least one monitored register, each monitored register having been identified as storing an input variable to a jump table switch statement, a jump table switch statement being a switch statement that has been compiled to a jump table; receiving at the branch predictor an instruction for prediction; determining, using the branch predictor, whether the received instruction writes to one of the monitored registers with an update value; in response to determining that the received instruction writes to one of the monitored registers with an update value, updating the current value in the register table for the register written to with the update value; and predicting, using the branch predictor, the target location of a jump table switch statement instruction using the current value.

A second aspect provides a branch predictor comprising: a register table (116, 534, 536), the register table storing a current value for at least one monitored register, each monitored register having been identified as storing an input variable to a jump table switch statement, a jump table switch statement being a switch statement that has been compiled to a jump table; and a logic unit in communication with the register table (116, 534, 536), the logic unit configured to: receive an instruction for prediction; determine whether the received instruction writes to one of the monitored registers with an update value; in response to determining that the received instruction writes to one of the monitored registers with an update value, update the current value in the register table for the register written to with the update value; and predict the target location of a jump table switch statement instruction using the current value.

A third aspect provides a processor comprising the branch predictor according to the second aspect.

The methods described herein may be performed by a computer configured with software in machine readable form stored on a tangible storage medium e.g. in the form of a computer program comprising computer readable program code for configuring a computer to perform the constituent portions of described methods or in the form of a computer program comprising computer program code means adapted to perform all the steps of any of the methods described herein when the program is run on a computer and where the computer program may be embodied on a computer readable storage medium. Examples of tangible (or non-transitory) storage media include disks, thumb drives, memory cards etc and do not include propagated signals. The software can be suitable for execution on a parallel processor or a serial processor such that the method steps may be carried out in any suitable order, or simultaneously.

The hardware components described herein may be generated by a non-transitory computer readable storage medium having encoded thereon computer readable program code.

This acknowledges that firmware and software can be separately used and valuable. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

The preferred features may be combined as appropriate, as would be apparent to a skilled person, and may be combined with any of the aspects of the invention.

BRIEF DESCRIPTION OF THE DRAWINGS

Embodiments of the invention will be described, by way of example, with reference to the following drawings, in which:

FIG. 2 is a schematic diagram of an example register table of FIG. 1;

Figure 1:
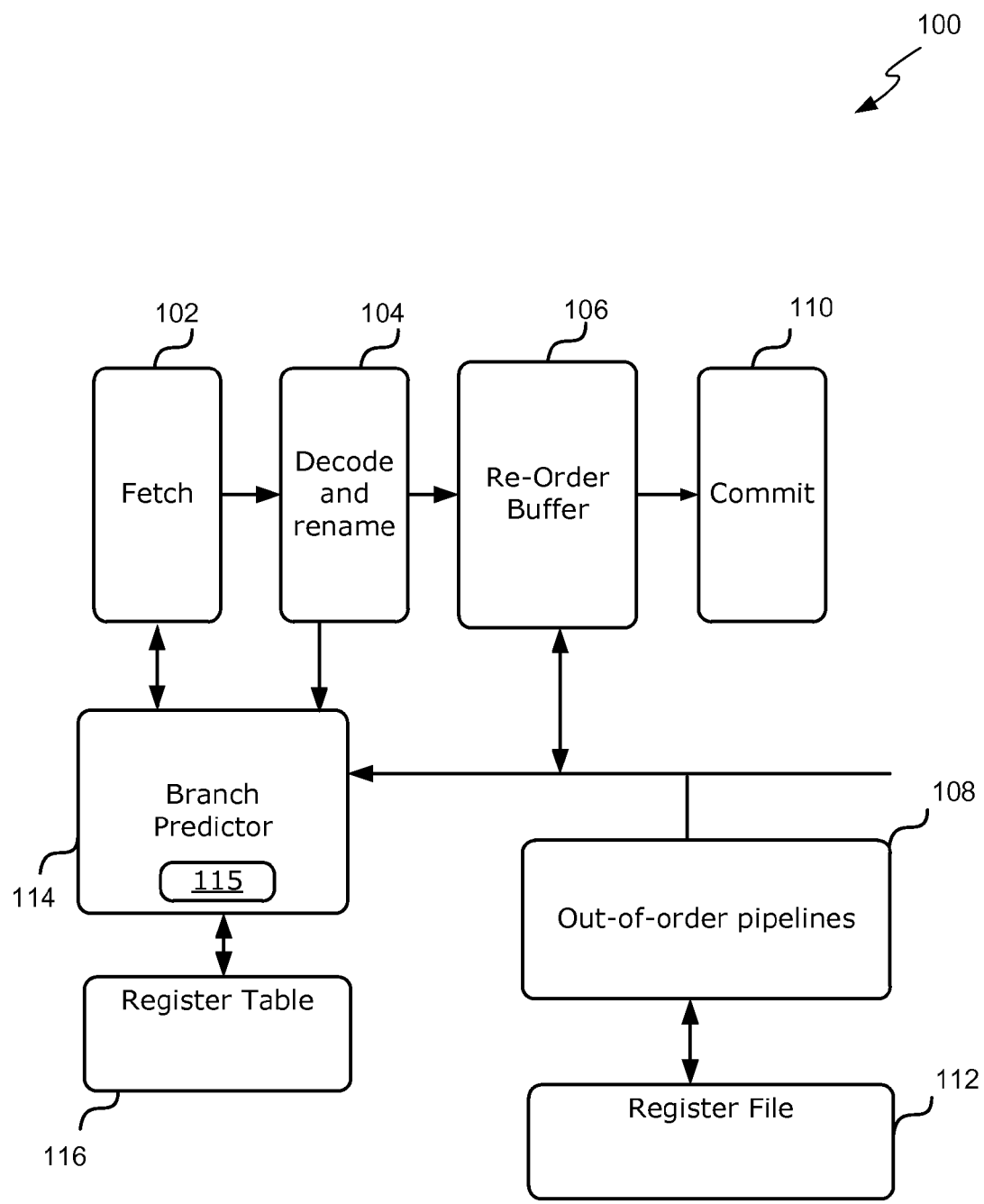
FIG. 1 is a schematic diagram of an example single-threaded out-of-order processor.

Common reference numerals are used throughout the figures to indicate similar features.

DETAILED DESCRIPTION

Embodiments of the present invention are described below by way of example only. These examples represent the best ways of putting the invention into practice that are currently known to the Applicant although they are not the only ways in which this could be achieved. The description sets forth the functions of the example and the sequence of steps for constructing and operating the example. However, the same or equivalent functions and sequences may be accomplished by different examples.

As described above, indirect branches (e.g. branches based on a variable rather than a constant value) are difficult to predict as the branch predictor must predict both whether the branch is taken and where the target will be. The target is particularly difficult to predict because it is typically based on a register value that is periodically changing.

Indirect branches are often used in finite state machines which can be seen as a loop with a C switch statement in it. As is known to those of skill in the art, switch statements are used as a substitute for long if statements that compare a variable to several values. The basic format for a switch statement is shown below.

```
switch ( <variable> ){
case value A:
        code to execute if <variable> == value A
        break;
case value B:
        code to execute if <variable> == value B
        break;
...
default:
        code to execute if <variable> does not equal the values
        associated with any of the cases
        break;
}
```

The switch statement can include any number of case instances. The value of the variable given into the switch (e.g. "<variable>" in the example above) is compared to the value assigned to each case (e.g. value A and value B in the example above) and when the variable matches one of the values the processor executes the program from that point until the end of the body or until a break statement. The default statement is executed if the variable does not match any of the case values. If the default statement is omitted, and no case match is found, none of the statements in the switch body are executed.

When making a finite state machine, the variable used in the switch statement is updated within each of the case statements. This switch statement is difficult to predict even though the variable may have been recently set.

The following is example code implementing a finite state machine (FSM) (comprising a switch statement) for parsing a number.

```
// state enumeration
enum e_state { INT, POINT, FLOAT, COMPLETE, INVALID };
// Function to go through and parse a number returning the type (as
an e_state type)
e_state example_fsm (char* first_char)
{
    char c;
    // initialise state
    e_state state = INT;
    // initialise c_ptr with pointer to first character
    char *c_ptr = first_char;
    // loop until the character is ',' or we reach an invalid state
    while(state != INVALID && c != ',')
    {
        // get current character and update pointer
        c = *c_ptr;
```

-continued

```
        c_ptr++;
        // switch based on current state
        switch (state)
        {
            case INT:
                // check for a decimal point
                if (c == '.')
                {
                    state = POINT;
                }
                break;
            case POINT:
                // check for a decimal point (not allowed as we
                already have one)
                if (c == '.')
                {
                    state = INVALID;
                }
                // everything else move to FLOAT state
                else
                {
                    state = FLOAT;
                }
                break;
            case FLOAT:
                // check for a decimal point (not allowed as we
                already have one)
                if (c == '.')
                {
                    state = INVALID;
                }
                break;
        }
    }
    // return the state
    return state;
}
```

The object of the example code is to determine whether a number is an integer or a floating point number (e.g. a number with a decimal point). Specifically, in the example code, the state variable is initially set to INT to indicate that the number is an integer. Then each character of the number is read one at a time until one of the characters is a comma or an invalid state is reached (e.g. a number with multiple decimal points). For each character it is determined whether the character is a period ("."). If one of the characters is a period (".") then the state variable is set to POINT to indicate that a decimal point has been found. Once one period (".") has been found the algorithm determines whether the character immediately following the period (".") is a period (".") or not. If the character immediately following the first period (".") is also a period (".") then the state variable is set to INVALID to indicate that it the number is not valid. If the character immediately following the first period (".") is not a period (".") then the state variable is set to FLOAT to indicate the number is a floating point number. The algorithm then checks each of the remaining characters to confirm that they are not periods ("."). The algorithm stops checking characters once the state is set to INVALID or it reaches a comma (",").

Some compliers are configured to convert switch statements into a series of comparisons and direct conditional branches when compiled. For example, the following switch statement may be converted into the machine code shown in Table 1.

```
switch (X){
case 1:
        code to execute if X=1;
        break;
```

-continued

```
            case 13:
                code to execute if X=13;
                break;
```

TABLE 1

| Address | Instruction | Comment |
|---------|-------------|---------|
| 0x20 | cmp eax, 0x1 | Switch statement Instruction: Compare value with 1 |
| 0x24 | je 0x40 | If value is 1 jump to code for case 1 |
| 0x28 | cmp eax, 0xD | compare value with 13 |
| 0x2C | je 0x80 | If value is 13 jump to code for case 13 |
| 0x30 | | Code if value is not 1 or 13 |
| ... | | |
| 0x40 | | Code for case 1 |
| ... | | |
| 0x80 | | Code for case 13 |

Some compilers are configured to optimize switch statements with a relatively small number of substantially sequential case values by converting such switch statements into a jump table when compiled. As is known to those of skill in the art, a jump table is an array with an element for each possible value of the switch statement variable (e.g. "state" in the above example). The value of each jump table element is an address which is where the code for the corresponding case statement is situated in memory. The code will use the variable (e.g. "state") to read an element from the jump table.

Example pseudo-code implementing a jump table for the above FSM example is shown below.

```
unsigned int jumpTable [3] {case_INT, case_POINT; case_FLOAT}
goto jumpTable[state]#
```

Here each element of the jump table is an address to code that implements the corresponding case. For example, jumpTable [0] contains the address case_INT which points to the block of instructions that execute case INT, jumpTable [1] contains the address case_POINT which points to the block of instructions that execute case POINT, and jumpTable [2] contains the address case_FLOAT which points to the block of instructions that execute case FLOAT.

A switch statement that has been converted to a jump table (e.g. because it has a small number of case values that are substantially sequential) will be referred to herein as a jump table switch statement.

In some cases the jump table is implemented using a serial list of unconditional branch instructions that is branched into using an offset created by multiplying a sequential index by the instruction length (the number of bytes in memory occupied by each instruction). When a switch statement has been converted into a jump table the index to the jump table is the switch statement variable (e.g. "state" in the above example) and the value of each jump table element is an unconditional branch instruction to jump to an address where the code for the corresponding case statement is situated memory. Accordingly, the switch statement variable (e.g. "state") is used to select the correct jump table element and once the correct jump table element is selected the program jumps to the address specified by the jump table element For example, the following switch statement (which has only two sequential case values (0 and 1)) may be converted into the machine code shown in Table 2.

```
switch (X){
    case 0:
        code to execute if X=0;
        break;
    case 1:
        code to execute if X=1;
        break;
```

TABLE 2

| Address | Instruction | Comment |
|---------|-------------|---------|
| 0x20 | jmp nextPC + eax * 4 | Switch statement Instruction: |
| 0x24 | jmp 0x40 | Jump Table Entry 0: Jump to code for case 0 |
| 0x28 | jmp 0x80 | Jump Table Entry 1: Jump to code for case 1 |
| ... | | |
| 0x40 | | Code for case 0 |
| ... | | |
| 0x80 | | Code for case 1 |

Switch statements that have been compiled into a jump table implemented using a serial list of unconditional branch instructions will be referred to herein as a relative jump table switch statement because the jump is relative to the address of the switch statement.

In other cases, instead of implementing the jump table as a serial list of jump statements as shown in Table 2, the jump table may be stored in memory as a series of addresses. In these cases the address stored in memory is loaded into the program counter by, for example, a statement such as PC=memory [JUMPTABLEBASE+INDEX] where JUMPTABLEBASE is a pointer to an array of pointers to each of the cases in the switch statement and INDEX is the value of the switch statement variable (i.e. the value of the variable being passed to the switch statement). Switch statements that have been compiled into a memory jump table will be referred to herein as an indexed jump table switch statement.

Different compilers use different criteria for determining when to implement a switch statement as a jump table. Specifically, different compilers have different criteria for determining when a case statement has a small number of case values and whether those case values can be converted into substantially sequential values. A jump table typically has an entry for each of the values between the smallest case value and the largest case value so there are typically null entries in the table for any case values that are not used in the switch statement. For example, a switch statement with case values of 0 and 5 is converted into a jump table with entries for case 0, case 1, case 2, case 3, case 4 and case 5. The entries for cases 1, 2, 3 and 4 will be null or otherwise invalid. Accordingly, where the case values of a switch statement are not directly sequential there is a tradeoff between the efficiency of a jump table and the extra memory required to store null values for case values that are not used.

Since the target address of a relative or indexed jump table switch statement instruction is based on the value of the switch statement variable, a more accurate prediction of the target address of a jump table switch statement instruction can made if the value of the switch statement variable is known or predicted.

Accordingly, the embodiments described herein relate to methods and branch predictors that monitor instructions at an early stage to determine if they write to registers used for jump table switch statement variables and the most recent values written to those registers are stored in a table maintained by the branch predictor. When it is time to make a prediction for a particular jump table switch statement instruction the branch predictor uses the register value stored in the table to predict where the jump table switch statement will branch to.

Reference is now made to FIG. 1 which illustrates a single-threaded out-of order processor 100 wherein writes to registers identified as being used for jump table switch statement variables are monitored and used to determine where a jump table switch statement instruction will branch to. The processor 100 comprises a fetch stage 102 configured to fetch instructions from a program (in program order) as indicated by a program counter (PC) and a decode and renaming stage 104 arranged to interpret the instructions and perform register renaming.

When an instruction passes through the decode and renaming stage 104, it is inserted into a reorder buffer 106 (ROB). The re-order buffer 106 is a buffer that enables the instructions to be executed out-of-order, but committed in-order. The re-order buffer 106 holds the instructions that are inserted into it in program order, but the instructions within the ROB 106 can be executed out of sequence by a plurality of out-of-order pipelines 108. In some examples, the re-order buffer 106 can be formed as a circular buffer having a head pointing to the oldest instruction in the ROB 106, and a tail pointing to the youngest instruction in the ROB 106. Instructions are output from the re-order buffer 106 in program order. In other words, instructions are output from the head of the ROB 106 when that instruction has been executed by the out-of-order pipelines 108, and the head is increment to the next instruction in the ROB 106. Instructions output from the re-order buffer 106 are provided to a commit stage 110, which commits the results of the instructions to the register/memory.

The out-of-order pipelines 108 typically access one or more register files 112 to perform reads and/or writes to the physical registers.

The processor 100 also comprises a branch predictor 114, which is configured to predict which direction the program flow will take in the case of instructions known to cause possible flow changes, such as branch instructions. Branch prediction is useful as it enables instructions to be speculatively executed by the processor 100 before the outcome of the branch instruction is known. The branch predictor 114 can receive inputs from the fetch stage 102 and decode and renaming stage 104 relating to new instructions, and input from the out-of-order pipelines 108.

When the branch predictor 114 predicts the program flow accurately, this improves performance of the processor 100. However, if the branch predictor 114 does not correctly predict the branch direction, then a misprediction occurs which needs to be corrected before the program can continue. To correct a misprediction, the speculative instructions sent to the ROB 106 are abandoned, and the fetch stage 102 starts fetching instructions from the correct program branch.

To improve the accuracy of indirect branch predictions, the branch predictor 114 comprises at least one logic unit 115 configured to detect jump table switch statements in the program and identify registers used as input to the detected switch statements. The input to a switch statement will be referred to herein as a switch statement variable. The logic unit 115 then looks for instructions that write an immediate (e.g. constant value) to any of the identified registers. Any immediate written to a monitored register is then stored in a register table 116 maintained by the branch predictor 114. The register table 116 is separate and distinct from the main register file(s) 112 described above. An example register table 116 is described in reference to FIG. 2.

For example, the logic unit 115 may monitor instructions fetched from the fetch stage 102. If the logic unit 115 detects an instruction that writes an immediate to a register, the logic unit 115 decodes the instruction to determine the register written to and the immediate. If the decoded register is one of the identified registers (a register used as input to a jump table switch statement) then the immediate is stored in the register table 116. Since the logic unit 115 monitors instructions at a very early stage in the pipeline the register table 116 is written to/updated much earlier than the main register file(s) 112 allowing the target address of jump table switch statement instructions to be more accurately predicted earlier. In particular, in contrast to the register table 116 that is updated after the instruction has been fetched, the main register file 112 is not typically written to/updated until after decoding and execution of the instruction.

When it is time to make a prediction for a particular jump table switch statement instruction, the logic unit 115 uses the register value stored in the register table 116 to predict where the switch statement will branch to. Example methods for (a) monitoring writes to a register; and (b) using a stored register value to predict where a jump table switch statement instruction will branch to will be described in reference to FIGS. 3 and 4 respectively.

The logic unit 115 may be implemented using any suitable hardware logic.

Reference is now made to FIG. 2, which illustrates an example register table 116 of FIG. 1. The register table 116 is used to store: (a) a list of jump table switch statement instructions detected in a program; (b) the registers used as input to the jump table switch statements; and, (c) the most recent value written to each of these registers.

In FIG. 2 the register table 116 is divided into a number of rows 202, 204, 206 and 208 and columns 210, 212, 214 and 216. Each row 202, 204, 206 and 208 represents a jump table switch statement instruction that was detected in the program. In the example shown in FIG. 2 four jump table switch statement instructions have been detected in the program and thus there are four rows 202, 204, 206 and 208, one for each detected jump table switch statement instruction.

Each column 210, 212, 214 and 216 holds a specific piece of information related to the detected instruction. In the example shown in FIG. 2, there are four columns: an instruction identification tag column 210, an argument register ID column 212, an argument register value column 214, and an argument valid column 216. In other cases the register table 116 may have more, fewer or different columns.

The instruction identification tag column 210 stores a tag that identifies a detected jump table switch statement instruction. The tag may be used by the branch predictor 114 to determine if the register table 116 comprises an entry for a particular jump table switch statement instruction. If the register table 116 comprises an entry for a particular switch statement instruction the target for that switch statement instruction may be predicted using the data in the register table 116.

In some cases the tag is the program counter for the instruction. In other cases, the tag is only a portion of the program counter (e.g. the bottom sixteen bits). Using only a portion of the program counter reduces the size of the register table 116 compared to cases where the entire program counter is used, however, in these cases the branch predictor 114 cannot be one hundred percent certain that the detected jump table switch statement instruction is in the register table 116 since multiple instructions may have the same tag. In yet other cases, other suitable information may be used to identify the location of the instruction.

In some cases the register table 116 may not comprise an instruction identification tag column 210. In these cases the branch predictor may use the argument register ID stored in the argument register ID column 212 to determine if the register table 116 comprises an entry for a particular jump table switch statement instruction.

The argument register ID column 212 stores information that identifies the register used to provide the argument input or variable to the associated jump table switch statement (e.g. the register used for the "state" variable in the FSM example above). In some cases the identifying information is the register ID (e.g. R8 or D0.8). Once identifying information for a register has been added to the table that particular register becomes a monitored register and the branch predictor monitors the instructions for writes to this register.

The argument register value column 214 stores the most recent immediate (e.g. current value) written to the register identified in the corresponding argument register ID column 212. In some cases each argument register value is initially assigned a default value (e.g. "NA" in the example shown in FIG. 2) to indicate that the register has not been written to. Once the register is written to the argument register value is updated with the update value. In some cases, the argument register value column 214 is updated each time the associated register is written to.

The argument valid column 216 stores information on whether the register value stored in the associated register value column 214 is valid. In some cases, an argument register value is considered valid if an immediate (e.g. a constant value) has been written to the register identified in the argument register ID column 212 at least once. In these cases each argument valid value may be initially set to indicate that the argument register value is not valid and only updated to indicate that the argument register value is valid after a constant value has been written to the register. In these cases the argument valid column 216 may only be updated once during execution (e.g. the first time the register is written to with a constant value) or it may not be updated at all if a constant value is never written to the register.

In some cases, the argument valid column may be implemented by a single bit which is either disabled (e.g. set to 0) or enabled (e.g. set to 1) or a Boolean value which is either set to TRUE or FALSE. In some cases, once the valid bit is changed from an initial state to the other state, it may be automatically changed back to the initial state after a predetermined period of time.

In some cases, instead of the register table 116 having an argument valid column 216, the register table 116 may have a counter column (not shown) that stores information on the number of times that that value in the associated argument register value column 214 has been used to predict a target location since it was updated. Each time the value in the associated argument register value column 214 is updated the counter may be reset to a maximum value. Then each time the value in the associated argument register value column 214 is used to predict the target of a switch statement instruction the counter may be decremented. This information may then be used by the branch predictor 114 to determine if the data in the corresponding argument register value column 214 is valid. For example, in some cases, the branch predictor 114 may only use the data in the corresponding argument register value column 214 to predict the target location if the counter has not been decremented to or below a threshold value (e.g. zero).

The number of bits allocated to the counter is selected so that it is large enough to ensure that the branch predictor 114 can still use valid data. For example, in some cases the counter may be allocated two bits. Each time the value in the associated argument register value column 214 is updated the counter is set to three ("11" in binary) and each time the value in the associated argument register value column 214 is used to predict the target location of a switch statement instruction the counter is decremented.

In other cases, instead of the register table 116 having an argument valid column 216, the register table 116 may have a confidence column (not shown) that stores a confidence value. The confidence value may indicate the likelihood that the data in the associated argument register value column 214 will predict the correct target location.

In some cases, when a switch statement instruction is initially detected and added to the register table 116, the confidence value may be set to zero (e.g. indicating there is low or no confidence in the register value stored in the corresponding argument register value column 214). When the switch statement is subsequently executed by the out-of-order pipelines 108, the out-of-order pipelines 108 may provide the branch predictor 114 with the update to the program counter. The branch predictor may then compare the updated program counter value to the register value stored in the relevant argument register value column 214. If the updated program counter and the stored register value match then the confidence value may be increased. If the updated program counter and the stored register value do not match then the confidence value may be decreased or set to 0. In some cases the branch predictor 114 may only use the data in the corresponding argument register value column 214 to predict the target location if the confidence value is above a predetermined threshold (e.g. 0 or 1). Using a confidence metric to determine whether to predict the target using the stored register value may reduce the number of incorrectly predicted targets.

In yet other cases, instead of the register table 116 having an argument valid column it may have both a counter column (not shown) and a confidence column (not shown) as described above.

In some cases the register table 116 may further comprise a switch valid column (not shown) which indicates whether the row is valid. In other cases, the tag may be set to a predetermined value (0x00000000) to indicate that the corresponding row is not valid. In some cases, the switch valid column or the tags in the register table 116 may be set to a value that indicates that the data in the corresponding row is not valid upon initialization or reset of the branch predictor 114. Initialization or resetting of the branch predictor 114 may, for example, occur when the processor is reset or the thread is stopped. In these cases, once valid data is written to a row (e.g. after a switch statement instruction has been identified) the switch valid column and/or the tag is updated with a value that indicates that the data in the row is valid. When the register table 116 has a fixed size, the switch valid column and/or the tag information may be used to determine which row to place new data into.

In some cases a complier may be configured to convert suitable switch statements (i.e. switch statements with a small number of substantially sequential case values) into only relative jump tables (i.e. a serial list of jump statements). Where, however, a compiler may be configured to convert suitable switch statements into either a relative jump table or an indexed jump table the register table 116 may have a column (not shown) that indicates whether the detected jump table switch statement is a relative jump table switch statement or an indexed jump table switch statement. For example, the register table 116 may comprise a relative/indexed column that comprises a single bit that is set, for example, when the branch predictor 114 has detected that the jump table switch statement is a relative jump table switch statement (i.e.

the jump table switch statement has been converted into a serial list of jump statements by the compiler) and is not set, for example, when the branch predictor 114 has detected that the jump table switch statement is an indexed jump table switch statement (i.e. the jump table switch statement has been converted into a memory list of addresses by the compiler). In these cases, the register table 116 may also have a column that is used to store the base address of an indexed jump table which may be used (as described below) in predicting the target address of an indexed jump table switch statement instruction.

In some cases each row 202, 204, 206 and 208 is between 32 and 64 bits long. In other cases the rows 202, 204, 206 and 208 may have a length that is above or below this range.

In some cases, the entries (e.g. rows) in the register table 116 are organized based on when they were added to the register table 116. For example, in some cases any new entries are added to the top of the table and older entries are pushed to the bottom of the table.

In other cases, the entries (e.g. rows) are organized in the register table 116 based on how recently they have been accessed. For example, in some cases the most recently accessed entries (e.g. rows) are placed at the top of the register table 116 and the least recently accessed entries (e.g. rows) are placed at the bottom of the register table 116. If the example shown in FIG. 2 were organized in this manner then the first row 202 would be the most recently accessed entry and the fourth row 208 would be the entry that was least recently accessed. In these cases, once an entry (e.g. row) is added, modified (e.g. updated), or otherwise accessed (e.g. read) it is added/moved to the top of the register table 116.

In some cases, the register table may have a fixed sized (e.g. two or four entries). Organizing the register table 116 based on how recently the entry was accessed allows a fixed-size register table 116 to maintain the most recently accessed entries and overwrite older, least recently accessed entries.

Physically moving the entries in the register table consumes power. Accordingly, to reduce the power associated with organizing the entries in the register table 116, in another example, the register table may comprise an order column (not shown) that stores information on the order of the entries. The data in the order column is then used to distinguish the oldest entries from the newest entries. For example, the order column may store a number that represents the order of the entry in the register table 116. The number may represent how recently the entry was added and/or how recently the entry was accessed.

Figure 3:
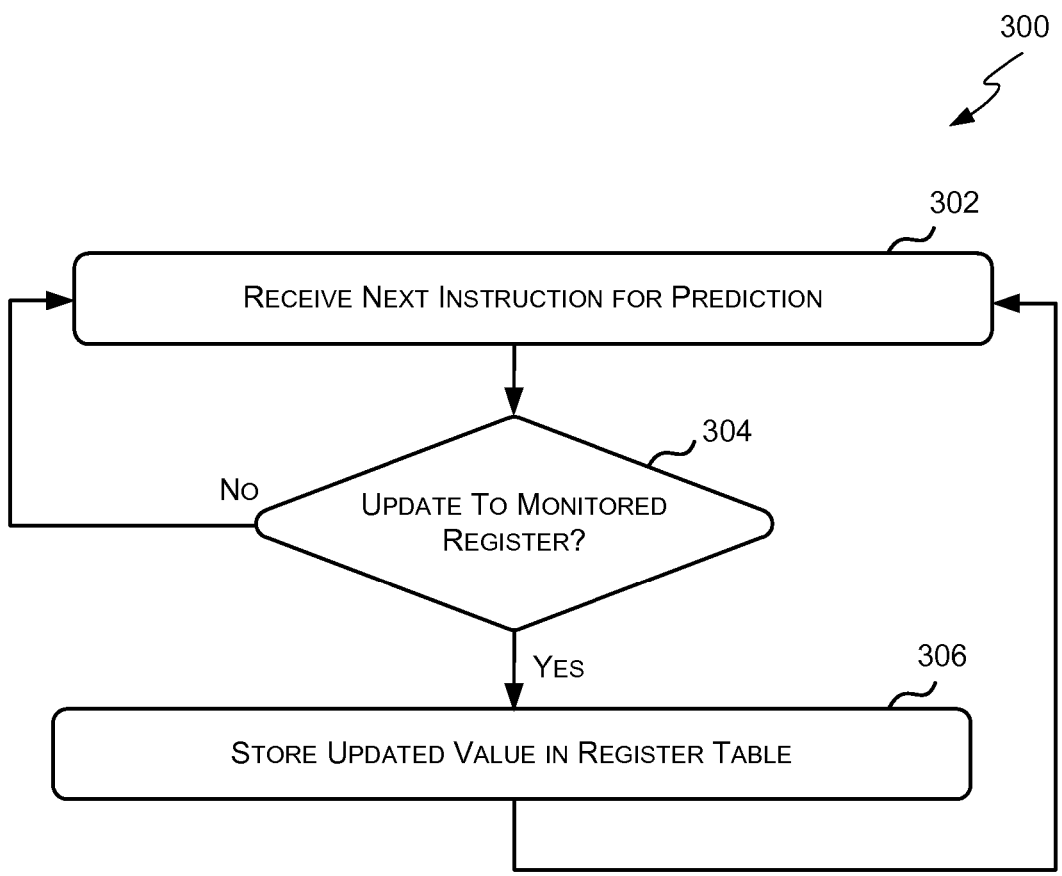
FIG. 3 is a flowchart of a method for monitoring registers used for switch statement variables.

Reference is now made to FIG. 3 which illustrates a method 300, which may be implemented by the branch predictor 114, for monitoring registers used for jump table switch statement variables. At step 302, the next instruction for prediction is received from the fetch stage 102. Once the next instruction has been received, the method 300 proceeds to step 304.

At step 304, it is determined whether the instruction writes an immediate (e.g. constant value) to one of the monitored registers (e.g. one of the registers listed in the register table 116). Determining whether the instruction writes an immediate to one of the monitored registers may comprise first determining if the instruction is a write instruction. If it is determined that the instruction is a write instruction it may then be determined whether the write instruction writes an immediate (e.g. constant value) to a register. If the write instruction writes an immediate (e.g. constant value) to a register then it is determined whether the write instruction writes an immediate to one of the monitored registers. Determining whether the write instruction writes to one of the monitored registers may comprise decoding the instruction and comparing the register IDs listed in the register table to the ID of the write register referred to in the decoded write instruction.

In some cases the decoding may be performed by a branch predictor, such as branch predictor 114. For example, the branch predictor may assess a predetermined number of bits of the instruction (e.g. nine bits) to determine if it is an immediate write and then assess another predetermined number of bits of the instruction (e.g. five bits) to determine the register ID and yet another predetermined number of bits of the instruction (e.g. sixteen bits) to determine the immediate.

If it is determined that the instruction writes an immediate to one of the monitored registers then the method proceeds to step 306. If, however, it is determined that the instruction does not write an immediate to one of the monitored registers then the method 300 proceeds back to step 302 where the next instruction is received.

At step 306, the update value (e.g. the value written to the monitored register) is stored in the register table 116. Storing the update value in the register table 116 may comprise locating the relevant row in the register table 116 based on the register ID and then updating the current register value with the update value. Once the update value has been stored in the register table 116, any valid bit and/or counter may be updated to reflect the fact that the register value has been updated. Once the register table 116 has been updated, the method 300 proceeds back to step 302 where the process is repeated for the next instruction.

There is only a minor increase in power requirements to operate the processor 100 if method 300 is executed continuously.

Figure 4:
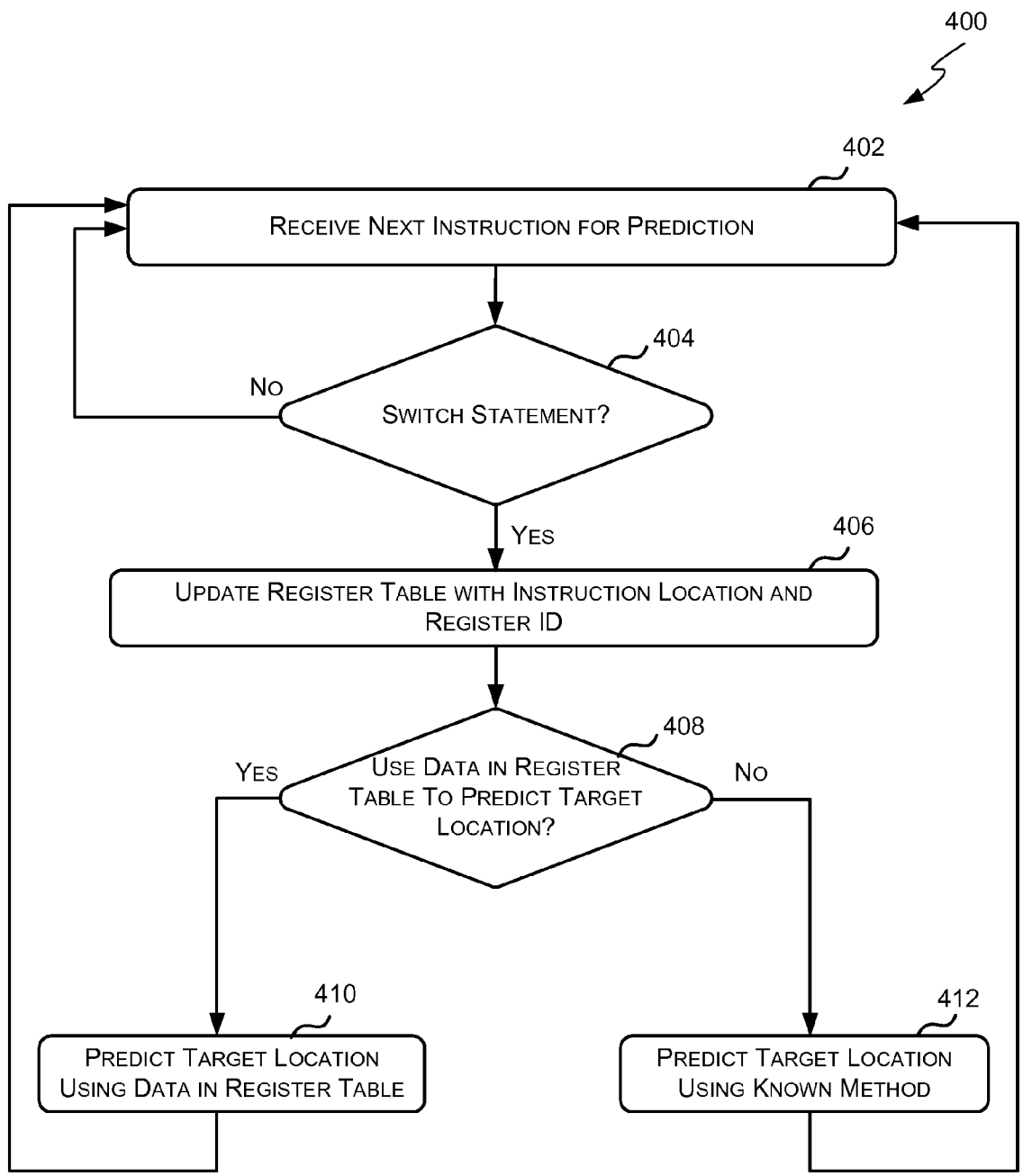
FIG. 4 is a flowchart of a method for predicting the target location of a switch statement instruction using the data in the register table of FIGS. 1 and 2.

Reference is now made to FIG. 4 which illustrates a method 400 for predicting the target location of a jump table switch statement instruction using the data in the register table 116. At step 402, the next instruction for prediction is received from the fetch stage 102. In some cases the instruction is received at a branch predictor, such as branch predictor 114. Once the next instruction has been received, the method 400 proceeds to step 404.

At step 404, it is determined whether the received instruction is a jump table switch statement instruction. In some cases determining whether the received instruction is a jump table switch statement instruction comprises determining whether the instruction has a predefined pattern. For example, in some cases determining whether an instruction is a jump table switch statement instruction comprises determining whether the instruction has a pattern that indicates it is a jump table instruction. In some cases the determination of whether the received instruction is a jump table switch statement instruction is made by a branch predictor, such as branch predictor 114. If it is determined that the instruction is a jump table switch statement instruction, the method 400 proceeds to step 406. If, however, it is determined that the instruction is not a jump table switch statement instruction, then the method 400 proceeds back to step 402 where the next instruction for prediction is received.

At step 406, a register table, such as register table 116, is updated with information identifying the location of the instruction (e.g. the program counter of the instruction) and information identifying the ID of the argument register (e.g. the register ID for the register used for the switch statement/jump table variable).

If the register table already contains an entry (e.g. row) for the instruction then the relevant entry (e.g. row) in the register table may be moved to the top of the register table or the order number updated to reflect the fact that this entry has been recently accessed. In some cases determining whether the register table already contains an entry (e.g. row) for the instruction comprises comparing the program counter for the switch statement instruction to the instruction identification tags in the register table 116. In other cases determining whether the register table already contains an entry (e.g. row) for the instruction comprises comparing the register ID of the register used for the switch statement variable to the register IDs listed in the register table.

In some cases the register table is updated by a branch predictor, such as branch predictor 114. Once the register table has been updated, the method 400 proceeds to step 408.

At step 408, it is determined whether the target location is to be predicted using the relevant argument register value stored in the register table (such as register table 116). In some cases determining whether the target location is to be predicted using the relevant argument register value stored in the register table comprises looking at the argument valid value to determine if it indicates that the register value data in the register table is valid. In these cases, if the argument valid value indicates that the register value in the register table is valid then it may be determined that the target location is to be predicted using the stored register value. Conversely, if the argument valid value indicates that the corresponding register value in the register table is not valid then it may be determined that the target location is not to be predicted using the stored register value.

In other cases determining whether the target location is to be predicted using the relevant argument register value stored in the register table may comprise analyzing the counter and/or confidence values in the register table. For example, it may be determined that the stored register value is to be used to predict the target location if the counter and/or confidence level is above a predetermined threshold value. As described above, the counter and confidence levels may have different threshold values which may be a zero or non-zero value.

In some cases the determination of whether the target location is to be predicted using the stored argument register value may be made by a branch predictor, such as branch predictor 114. If it is determined that the target location is to be predicted using the stored argument register value then the method 400 proceeds to step 410. If, however, it is determined that the target location is not to be predicted using the stored argument register value then the method 400 proceeds to step 412.

At step 410, the target location is predicted using the relevant register value stored in the register table. In some cases the target location is predicted by combining the program counter for the switch statement instruction and the register value stored in the register table (also referred to as the current value).

In general, the switch statement variable (stored in the relevant register) comprises one of the values in the switch statement (e.g. "value A" or "value B" in the basic switch statement example above).

Where the switch statement is a relative jump table switch statement (i.e. the switch statement has been converted into a series of jump statements as described above) the target location will be X instructions in front of the current program counter, where X is the variable (e.g. register) value. Where each instruction is N bytes in length then the target location may be calculated by determining the location of the next instruction after the program counter (the program counter of the switch instruction+N) and adding to that the register value multiplied by N (the length of each instruction in bytes). This can be represented by formulas (1) or (2) shown below where T is the target location, PC is the program counter of the switch statement instruction, N is the length in bytes of each instruction, and "current value" is the register value stored in the register table 116.

$$T=(PC+N)+N*\text{current value} \quad (1)$$

$$T=PC+N*(\text{current value}+1) \quad (2)$$

The target location will then contain a direct unconditional branch to the body of the code for that case which is predictable using traditional prediction methods.

For example, Table 3 shows an example relative jump table switch statement with two cases (case 0 and case 1). In the example, each instruction is four bytes long and the switch statement is at address 0x20. According to formula (1) the target location is equal to (0x20+4)+4*stored register value for R8. Thus if the stored register value for R8 is 0 then the target will be 0x24. This address provides a direct unconditional branch to address 0x40 which comprises the code for case 0. Similarly if the stored register value for R8 is 1 then the target will be 0x28. This address provides a direct unconditional branch to address 0x80 which comprises the code for case 1.

TABLE 3

| Address | Address of Next Instruction | Comment |
|---------|----------------------------|---------|
| 0x20    | (PC + 4) + 4 * R8          | Switch statement Instruction |
| 0x24    | 0x40                        | case 0: |
| 0x28    | 0x80                        | case 1: |
| ...     |                             |         |
| 0x40    |                             | Code for case 0 |
| ...     |                             |         |
| 0x80    |                             | Code for case 1 |

Where the switch statement is an indexed jump table switch statement (i.e. the switch statement has been converted into a memory jump table as described above) the address of the next instruction is located at memory address JUMPTABLEBASE+INDEX where JUMPTABLEBASE is a pointer to an array of pointers to each of the cases in the switch statement and INDEX is the value of the switch statement variable (the input to the switch statement/jump table). For these types of jump table switch statements the INDEX can be predicted from the data in the register table 116. In some cases the predicted index is used as a hint to traditional indirect branch predictors. In other cases (as described above) the JUMPTABLEBASE address is also stored in the register table 116 and may be used in conjunction with the INDEX to predict the next address.

In some cases, the target location is predicted by a branch predictor, such as branch predictor 114. Once the target location has been predicted the method 400 proceeds back to step 402 to receive the next instruction for prediction.

At step 412, the target location is predicted using known indirect branch prediction means. For example, in some cases the target location may be predicted such using a branch target buffer (BTB). As is known to those of skill in the art a BTB is a small cache that maps indirect branch addresses into predicted target addresses. Once the target location has been predicted the method 400 proceeds back to step 402 to receive the next instruction for prediction.

Method 300 of FIG. 3 and method 400 of FIG. 4 may be executed in parallel.

In the case of a finite state machine the jump table switch statement is in a loop and will execute multiple times. In method 400, the first time the jump table switch statement is detected it is added to the register table. Once the switch statement instruction has been added to the register table, method 300 will monitor instructions that write to that argument register and store any immediate (e.g. constant value) that is written to the register in the register table. Then in method 400 when the jump table switch statement is subsequently detected, the target may be predicted using the argument register value stored in the register table as described above.

In some cases, implementing the methods and techniques described herein may allow the size of the traditional branch predictor to be reduced. In particular, if the methods and techniques described herein are used to predict at least a subset of the indirect branches then these indirect branches do not need to be predicted using traditional techniques (i.e. BTB). Accordingly, the size of the BTB can be reduced to take this into account thereby at least partially offsetting the additional area to implement the methods and techniques described herein.

Switch statements are often used in code for parsing a file (e.g. a text file) which involves continuously reading a new character or variable and setting the state/variable based on the current character/variable. The methods and principles described herein decrease the likelihood of an incorrect prediction for a switch statement (and thus decrease the chances of a rewind) and therefore may increase the speed at which this type of code is executed. Accordingly, a computer-based device in which the methods and principles described herein are implemented may result in quicker parsing of a configuration file used at start-up of the computer-based device or upon start-up of an application. This may significantly reduce the amount of time it takes for the computer-based device itself to start-up or boot or for an application running on the computer-based device to start-up-or boot.

Figure 5:
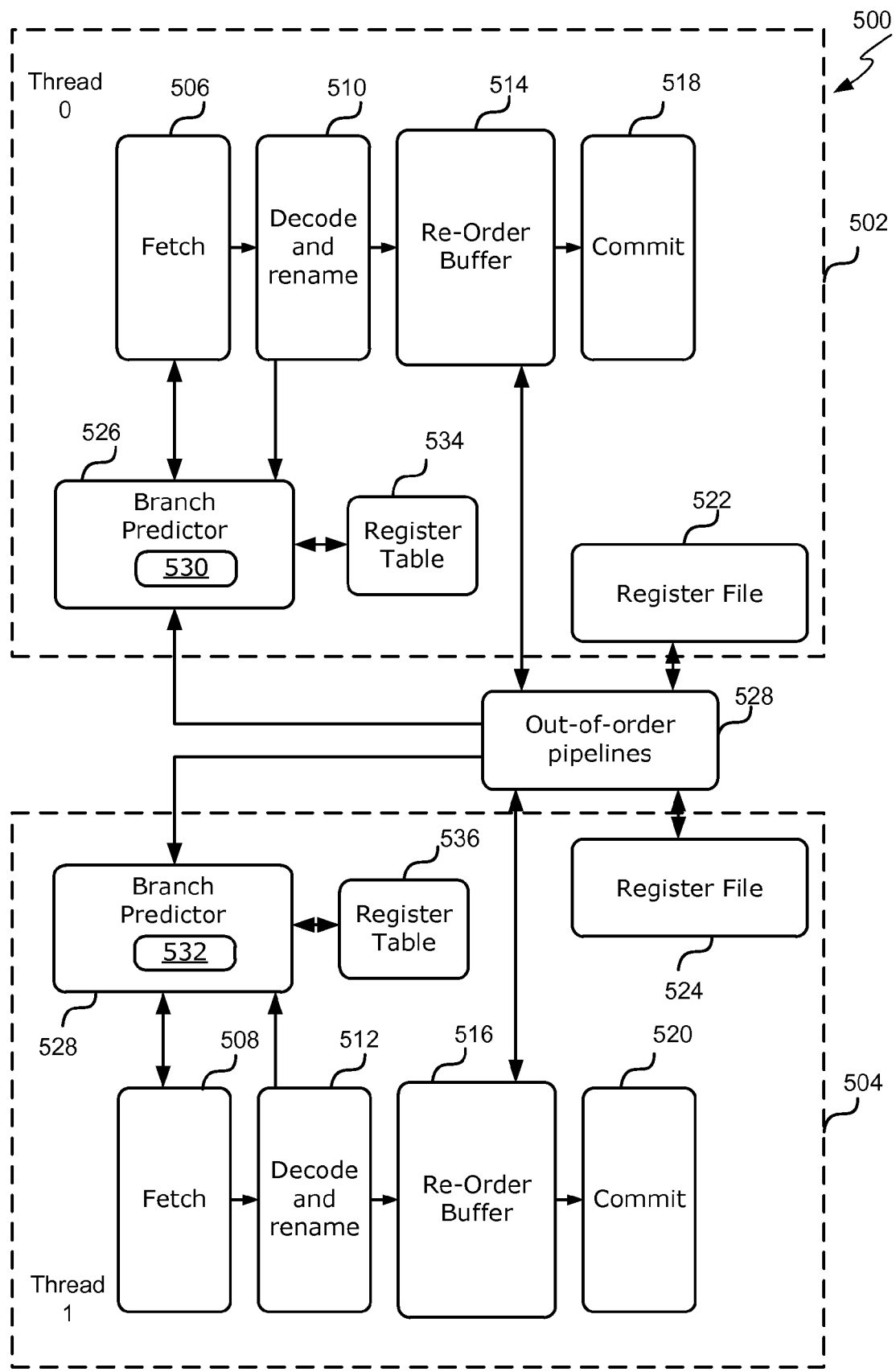
FIG. 5 is a schematic diagram of an example multi-threaded out-of-order processor.

FIG. 5 will be used to illustrate how the techniques and methods described herein may be applied to a multi-threaded out-of-order processor.

Reference is now made to FIG. 5 which illustrates a schematic of a multi-threaded out-of order processor 500. The processor 500 comprises two threads 502 and 504 which will be referred to herein as thread 0 and thread 1 respectively. Each thread 502 and 504 comprises a fetch stage 506 or 508, a decode and renaming stage 510 or 512, a re-order buffer 514 or 516, a commit stage 518 or 520, one or more register files 522 or 524, and a branch predictor 526 or 528 as described above in reference to FIG. 1. The threads 502 and 504 share the out-of-order pipelines 528 as described above in reference to FIG. 1. In the example shown in FIG. 5, each branch predictor 526 or 528 comprises a logic unit 530 or 532 that maintains its own register table 534 and 536 as described above for each thread 502 and 504. Each logic unit 530 or 532 then uses the entries in the corresponding register table 534 or 536 to predict the target location of switch statement instructions for a particular thread 502 or 504.

In other cases the branch predictors 526 and 528 may share a single register table which comprises an additional column that indicates which thread 502 or 504 the instruction is associated with. This may reduce the amount of physical space required to implement the register table(s), however, if the size of the single register table is limited the chances of one thread ejecting or overwriting another thread's entries may be increased. In these cases the logic unit 530 or 532 uses the entries in the single register table to predict the target location of switch statement instructions for a particular thread 502 or 504.

Although the techniques and methods described herein have been described in reference to out-of-order processors, it will be apparent to the skilled person that the techniques and method described herein may be equally applied to other processors, such as in-order processors.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Memories storing machine executable data for use in implementing disclosed aspects can be non-transitory media. Non-transitory media can be volatile or non-volatile. Examples of volatile non-transitory media include semiconductor-based memory, such as SRAM or DRAM. Examples of technologies that can be used to implement non-volatile memory include optical and magnetic memory technologies, flash memory, phase change memory, resistive RAM.

A particular reference to "logic" refers to structure that performs a function or functions. An example of logic includes circuitry that is arranged to perform those function(s). For example, such circuitry may include transistors and/or other hardware elements available in a manufacturing process. Such transistors and/or other elements may be used to form circuitry or structures that implement and/or contain memory, such as registers, flip flops, or latches, logical operators, such as Boolean operations, mathematical operators, such as adders, multipliers, or shifters, and interconnect, by way of example. Such elements may be provided as custom circuits or standard cell libraries, macros, or at other levels of abstraction. Such elements may be interconnected in a specific arrangement. Logic may include circuitry that is fixed function and circuitry can be programmed to perform a function or functions; such programming may be provided from a firmware or software update or control mechanism. Logic identified to perform one function may also include logic that implements a constituent function or sub-process. In an example, hardware logic has circuitry that implements a fixed function operation, or operations, state machine or process.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages.

Any reference to an item refers to one or more of those items. The term 'comprising' is used herein to mean including the method blocks or elements identified, but that such blocks or elements do not comprise an exclusive list and an apparatus may contain additional blocks or elements and a method may contain additional operations or elements. Furthermore, the blocks, elements and operations are themselves not impliedly closed.

The steps of the methods described herein may be carried out in any suitable order, or simultaneously where appropriate. The arrows between boxes in the figures show one example sequence of method steps but are not intended to exclude other sequences or the performance of multiple steps in parallel. Additionally, individual blocks may be deleted from any of the methods without departing from the spirit and scope of the subject matter described herein. Aspects of any of the examples described above may be combined with aspects of any of the other examples described to form further examples without losing the effect sought. Where elements of the figures are shown connected by arrows, it will be appreciated that these arrows show just one example flow of communications (including data and control messages) between elements. The flow between elements may be in either direction or in both directions.

It will be understood that the above description of a preferred embodiment is given by way of example only and that various modifications may be made by those skilled in the art. Although various embodiments have been described above with a certain degree of particularity, or with reference to one or more individual embodiments, those skilled in the art could make numerous alterations to the disclosed embodiments without departing from the spirit or scope of this invention.

The invention claimed is:

1. A method to predict a target location of a switch statement in a program executed by a processor, the method comprising:
    storing, in a register table maintained by a branch predictor, a current value for at least one monitored register, each monitored register having been identified as storing an input variable to a jump table switch statement, a jump table switch statement being a switch statement that has been compiled to a jump table;
    receiving at the branch predictor an instruction for prediction;
    prior to the received instruction being executed, determining, using the branch predictor, whether the received instruction writes to one of the monitored registers with an update value;
    in response to determining that the received instruction writes to one of the monitored registers with an update value, updating the current value in the register table for the monitored register the received instruction writes to with the update value; and
    predicting, using the branch predictor, the target location of a jump table switch statement instruction using the current value.

2. The method according to claim 1, further comprising:
    receiving at the branch predictor another instruction for prediction;
    determining, at the branch predictor, whether the other instruction is a jump table switch statement instruction;
    in response to determining that the other instruction is a jump table switch statement instruction, determining whether the register table comprises a current value for the input variable to the jump table switch statement instruction; and
    in response to determining that the register table comprises a current value for the input variable to the jump table switch statement instruction, predicting the target location of the jump table switch statement instruction using the current value.

3. The method according to claim 2, wherein determining whether the other instruction is a jump table switch statement instruction comprises determining if the other instruction has a predetermined pattern.

4. The method according to claim 2, further comprising:
    in response to determining that the other instruction is a jump table switch statement instruction, making the register used to store the input variable to the jump table switch statement instruction a monitored register.

5. The method according to claim 4, wherein making the register used to store the input variable to the jump table switch statement instruction a monitored register comprises storing in the register table information identifying the register used to store the input variable to the jump table switch statement instruction.

6. The method according to claim 5, wherein determining whether the received instruction writes to one of the monitored registers comprises comparing the information in the register table identifying the registers used to store the input variables to the jump table switch statements to information in the received instruction identifying a write register.

7. The method according to claim 2, further comprising:
    in response to determining that the other instruction is a jump table switch statement instruction, determining whether the current value is to be used to predict the target location; and
    in response to determining that the current value is to be used to predict the target location, predicting the target location of the jump table switch statement instruction using the current value.

8. The method according to claim 7, wherein:
    the register table further comprises at least one of a valid bit, a counter and a confidence value for each monitored register; and
    determining whether the current value is to be used in predicting the target location comprises analyzing at least one of the valid bit, the counter and the confidence value.

9. The method according to claim 8, wherein the register table comprises a valid bit for each monitored register, each valid bit indicates whether the current value for the monitored register is valid.

10. The method according to claim 8, wherein the register table comprises a counter for each monitored register, each counter indicates how many times the current value for the monitored register has been used to predict a target location since it was updated; and determining whether the current value is to be used in predicting the target location comprises comparing the counter to a threshold value.

11. The method according to claim 8, wherein the register table comprises a confidence value for each monitored register, each confidence value indicates the likelihood that that the current value for the monitored register will correctly predict the target location for the associated jump table switch statement; and determining whether the current value is to be used in predicting the target location comprises comparing the confidence value to a threshold value.

12. The method according to claim 1, wherein predicting the target location of the jump table switch statement instruction using the current value comprises combining the program counter for the jump table switch statement instruction and the current value.

13. The method according to claim 12, wherein combining the program counter for the jump table switch statement instruction and the current value comprises:
    determining a program counter for the instruction immediately following the jump table switch statement instruction based on the program counter for the jump table switch statement instruction; and
    multiplying the current value by a factor N to generate a scaled current value, wherein N is the size of an instruction; and
    summing the program counter for the instruction immediately following the jump table switch statement instruction and the scaled current value.

14. The method according to claim 1, wherein the register table comprises a plurality of rows and the rows are ordered in the register table based on how recently they have been accessed.

15. A branch predictor comprising:
a register table, the register table storing a current value for at least one monitored register, each monitored register storing an input variable to a jump table switch statement, a jump table switch statement being a switch statement that has been compiled to a jump table; and
a logic unit in communication with the register table, the logic unit configured to:
receive an instruction for prediction;
prior to the received instruction being executed, determine whether the received instruction writes to one of the monitored registers with an update value;
in response to determining that the received instruction writes to one of the monitored registers with an update value, update the current value in the register table for the monitored register the received instruction writes to with the update value; and
predict the target location of a jump table switch statement instruction using the current value.

16. The branch predictor according to claim 15, wherein the logic unit is further configured to:
receive another instruction for prediction;
determine whether the other instruction is a jump table switch statement instruction;
in response to determining that the other instruction is a jump table switch statement instruction, determine whether the register table comprises a current value for the input variable to the jump table switch statement instruction; and
in response to determining that the register table comprises a current value for the input variable to the jump table switch statement instruction, predict the target location of the jump table switch statement instruction using the current value.

17. The branch predictor according to claim 16, wherein the logic unit is further configured to:
in response to determining that the other instruction is a jump table switch statement instruction, make the register used to store the input variable to the jump table switch statement instruction a monitored register.

18. The branch predictor according to claim 16, wherein the register table is configured to store a confidence value for each monitored register, each confidence value in the register table indicates the likelihood that the current value for the monitored register will correctly predict the target location for the associated jump table switch statement; and
the logic unit is further configured to:
in response to determining that the other instruction is a jump table switch statement instruction, determine whether the current value is to be used to predict the target location by comparing the confidence value to a threshold value; and
in response to determining that the current value is to be used to predict the target location, predicting the target location of the jump table switch statement instruction using the current value.

19. The branch predictor according to claim 15 wherein predicting the target location of a jump table switch statement instruction using the current value comprises combining the program counter for the jump table switch statement instruction and the current value.

20. A processor comprising a branch predictor, the branch predictor comprising:
a register table, the register table storing a current value for at least one monitored register, each monitored register having been identified as storing an input variable to a jump table switch statement, a jump table switch statement being a switch statement that has been compiled to a jump table; and
a logic unit in communication with the register table, the logic unit configured to:
receive an instruction for prediction;
prior to the received instruction being executed, determine whether the received instruction writes to one of the monitored registers with an update value;
in response to determining that the received instruction writes to one of the monitored registers with an update value, update the current value in the register table for the monitored register the received instruction writes to with the update value; and
predict the target location of a jump table switch statement instruction using the current value.

* * * * *